US006609436B2

(12) United States Patent
Laws

(10) Patent No.: US 6,609,436 B2
(45) Date of Patent: Aug. 26, 2003

(54) VEHICLE BRAKE PEDAL APPARATUS

(76) Inventor: James M. Laws, 34826 La Place Ct., Eustis, FL (US) 32736

( * ) Notice: Subject to any disclaimer, the term of this patent is extended or adjusted under 35 U.S.C. 154(b) by 4 days.

(21) Appl. No.: 10/034,933

(22) Filed: Jan. 3, 2002

(65) Prior Publication Data

US 2003/0121361 A1 Jul. 3, 2003

(51) Int. Cl.$^{7}$ .......................... G05G 1/14; F16D 13/76

(52) U.S. Cl. .......................... 74/512; 74/560; 74/478; 192/12 R; 192/13 R; 192/14; 192/16; 188/73.31

(58) Field of Search .......................... 74/512, 513, 514, 74/560, 478, 478.5, 562, 562.5, 563; 188/72.9, 73.31; 192/12 R, 13 R, 13 A, 14–17 R

(56) References Cited

U.S. PATENT DOCUMENTS

| | | | | | |
|---|---|---|---|---|---|
| 2,790,522 | A | | 4/1957 | Senkowski et al. | |
| 2,953,936 | A | * | 9/1960 | Wiley | 74/478 |
| 3,113,433 | A | * | 12/1963 | Kohlman | 60/54.6 |
| 3,143,000 | A | | 8/1964 | Wilson | |
| 3,181,388 | A | | 5/1965 | Riddy | |
| 3,739,579 | A | * | 6/1973 | Lutz | 60/54.6 R |
| 4,751,820 | A | * | 6/1988 | Douillet et al. | 60/581 |
| 4,949,590 | A | * | 8/1990 | Barker et al. | 74/512 |
| 5,884,532 | A | | 3/1999 | Rixon et al. | |
| 6,000,511 | A | * | 12/1999 | Ebert et al. | 192/13 R |
| 6,212,970 | B1 | * | 4/2001 | Bortolon | 74/560 X |
| 6,324,939 | B1 | * | 12/2001 | Cicotte | 74/512 |
| 6,457,568 | B2 | * | 10/2002 | Lang et al. | 188/73.31 |

FOREIGN PATENT DOCUMENTS

| | | | | |
|---|---|---|---|---|
| DE | 3234336 A1 * | 5/1984 | | 74/512 |
| JP | 60-42146 * | 3/1985 | | 74/562 |
| WO | WO 97/08602 * | 3/1997 | | 74/512 |

* cited by examiner

*Primary Examiner*—Vinh T. Luong
(74) *Attorney, Agent, or Firm*—William M. Hobby, III

(57) ABSTRACT

A vehicle brake pedal has first and second master cylinders and the first pedal arm removably attached to the vehicle having a brake pedal foot pad movably attached thereto. A second brake pedal arm is operatively coupled to the first master cylinder and coupled to the brake pedal foot pad on one end portion thereof for movement of the second brake pedal arm responsive to movement of the brake pedal pad. A third brake pedal arm operatively coupled to the second master cylinder is coupled to the brake pedal foot pad on another portion thereof. The movement of the third brake pedal arm is responsive to movement of the brake pedal foot pad so that the brake pedal foot pad can be rotated to different angles on the first pedal arm to thereby apply different pressure to the first and second master cylinders by carrying the brake pedal foot pad while applying pressure.

5 Claims, 1 Drawing Sheet

VEHICLE BRAKE PEDAL APPARATUS

BACKGROUND OF THE INVENTION

The present invention relates to a vehicle brake pedal and especially to a vehicle brake pedal which can apply different braking pressure to different master cylinders.

In a conventional automotive vehicle, a pedal is provided for controlling the brakes, which pedal is foot operated by the driver. In a typical automotive braking system, the driver applies pressure to a brake pedal which drives a master cylinder to apply pressure to the brake cylinders located at each wheel which drives the brakes pads against a braking rotor to brake the vehicle. Hydraulic pressure is applied from the master cylinder through fluid lines to individual brake cylinders and to individual brakes. A brake pedal is thus pushed by the operator of a vehicle to drive a piston in the master cylinder which then applies a fluid pressure from a reservoir to individual brake cylinders and brakes. Braking in vehicles is typically balanced and is different by a fixed ratio between the back and front wheels of a vehicle. In some vehicles, multiple master cylinders are provided so that the ratio of pressure can be adjusted between front and rear wheels. This is accomplished by adjusting the pressure applied from the different master cylinders.

Typical automotive brake systems can be seen in the Rixon et al. U.S. Pat. No. 5,884,532 for an adjustable pedal apparatus. The braking module includes two screw jacks which may be selectively extended or contracted to vary the distance to the pedal pad from the lower end of the pedal arm and thereby accommodate drivers of various statues. The Wiley U.S. Pat. No. 2,953,936 is an automotive brake actuating system in which the force transmitting mechanism for distributing an actuating force between two driven systems automatically changes the ratio with a delivered force to each system as the actuating force varies in intensity. The Kohlman U.S. Pat. No. 3,113,433 is a brake system which provides a plurality of master cylinders that are separate but allows the simultaneous actuation of the front and rear wheel brakes of a vehicle. The system includes means for materially increasing the effective force able to be supplied by the operator to the piston of such master cylinders without increasing the necessary manual effort of the operator. The Senkowski et al. U.S. Pat. No. 2,790,522 is a brake equalizer system having individual rear wheel brakes which may be operated either independently or in unison. The Wilson U.S. Pat. No. 3,143,000 is a brake system for vehicles which employs two independent braking systems each applying the brake or brakes on one side of the vehicle for steering purposes. The Riddy U.S. Pat. No. 3,181,388 is a braking system for a vehicle in which two brakes or sets of brakes are applied by separate actuating means which can be actuated individually or simultaneously.

The present invention is a vehicle brake pedal which allows a pair of brake master cylinders to have braking pressure applied thereto by the operator while continuously varying the ratio of the pressures applied to each master cylinder to thereby vary the braking pressure continuously between the front and rear brakes. The vehicle brake system in accordance with the present invention advantageously allows the driver of a racing vehicle to have better control of the braking of the vehicle during a race.

SUMMARY OF THE INVENTION

A vehicle brake pedal has first and second master cylinders and a first pedal arm movably attached to the vehicle and having a brake pedal foot pad movably attached thereto. A second brake pedal arm is operatively coupled to the first master cylinder and coupled to the brake pedal foot pad on one end portion thereof for movement of the second brake pedal arm responsive to movement of the brake pedal pad. A third brake pedal arm is operatively coupled to the second master cylinder and is coupled to the brake pedal foot pad on another portion thereof. The movement of the third brake pedal arm is responsive to movement of the brake pedal foot pad so that the brake pedal foot pad can be rotated to different angles on the first pedal arm to thereby apply different pressure to the first and second master cylinders by varying the brake pedal foot pad while applying pressure thereto.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
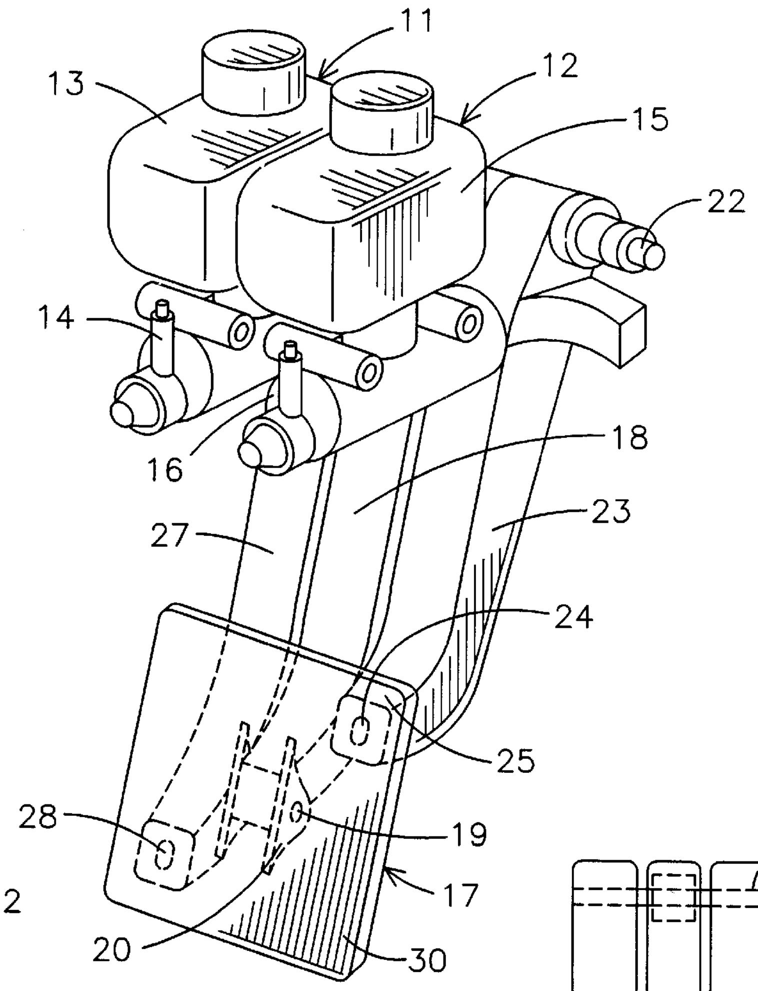
FIG. 1 is a perspective view of a vehicle brake pedal and braking system in accordance with the present invention.
Figure 2:
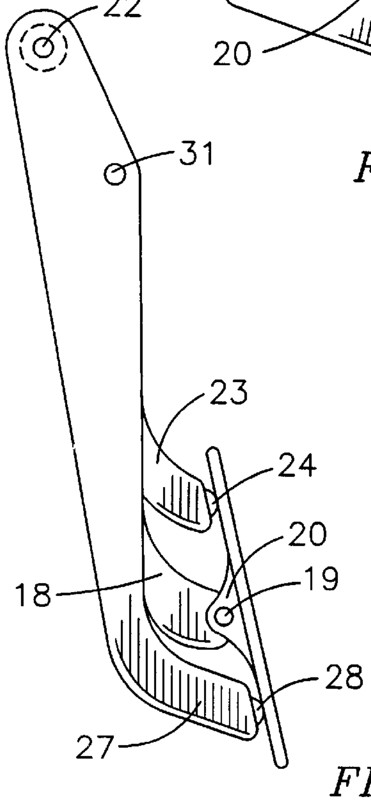
FIG. 2 is a side elevation of the brake pedal of FIG. 1.
Figure 3:
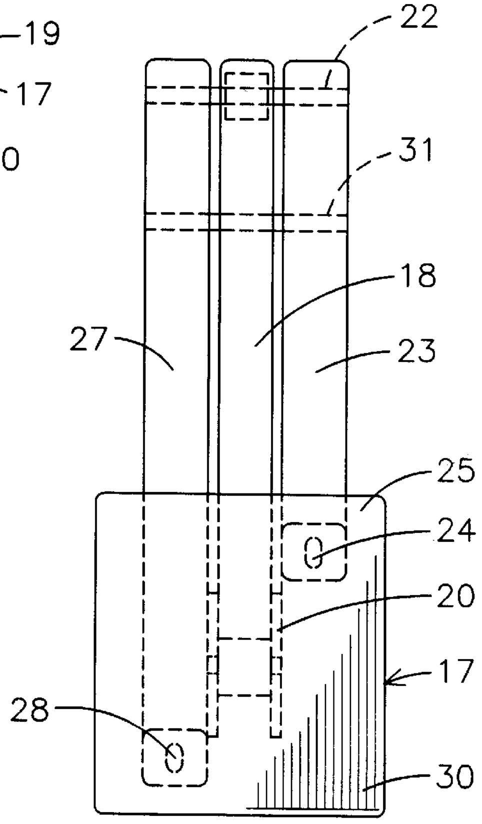
FIG. 3 is a front elevation of the brake pedal of FIG. 1.

Referring to the drawings of FIGS. 1–3, a braking system 10 has a first master cylinder 11 and a second master cylinder 12. The master cylinder 11 includes a reservoir 13 connected to the master cylinder portion 14 while the master cylinder 12 has a reservoir 15 connected to a master cylinder portion 16. The braking system 10 includes a brake pedal foot pad 17 supported on a pedal arm 18 with a bracket 20 attached to the pad 17 and to the arm 18 with a pin 19. The pedal arm 18 is connected to a balanced arm assembly and pivot pin 22 which in turn is attached to the floorboard of a vehicle, especially a racing vehicle. A brake pedal arm 23 is attached to the pin 22 at one end thereof for rotation thereon and has a roller ball 24 mounted on the other end thereof and positioned directly underneath the pad 17 along the upper portion 25 thereof. The arm 23 drives the master cylinder 12 when pressure is applied to the brake pedal arm 23. The second brake pedal arm 27 is longer than the arm 23 but is also attached to the brake pedal pivot pin 22 and has a roller ball 28 attached to the end thereof and positioned at the lower end 30 of the brake pedal 25. It will be clear that in place of roller balls, any low friction means, such as a Teflon surface, can be utilized without departing from the spirit and scope of the invention. The brake pedal arm 27 is operatively coupled to the master cylinder 11 for driving the master cylinder. The pin opening 31 allows the connection to the cylinder of the master cylinder.

In operation, the foot pedal 17 can be rotated to different angles on the pin 19 thereby changing the position of the brake pedal arm 23 relative to the brake pedal arm 27 so that when driving the pedal towards the floor board, the pedal brake arms 23 and 27 drive the master cylinders 11 and 12 for different lengths to vary the ratio of the pressure being applied by the master cylinders 11 and 12. Since the pedal 17 can be varied continuously by the driver of the vehicle on the pin 19 when driven downwardly at different angles, braking pressure applied by the master cylinders 11 and 12 can be continuously varied to thereby vary the braking pressure between the front and rear wheels of the vehicle. The driver's foot rotates the pedal 17 fore and aft on the pin 19 to manipulate the vehicle's braking system balance. As the driver applies more pressure to the pedal 17 upper portion 25 with his foot toe area, more front brake pressure is utilized. More heel pressure to the pedal 17 lower end 30 applies more pressure to the rear brakes.

It should be clear at this time that a vehicle brake pedal system has been provided which allows the braking of a vehicle while continuously varying the amount of pressure applied to different master cylinders and to different sets of brakes. However, the present system should not be considered as limited to the forms shown which are to be considered illustrative rather than restrictive.

I claim:

1. A vehicle brake pedal comprising:

first and second master cylinders;

a brake pedal pivot pin attached to a vehicle;

a first pedal arm mounted on said brake pedal pivot pin;

a brake pedal foot pad having two end portions and being movably attached to said first pedal arm;

a second brake pedal arm operatively coupled to said first master cylinder and movably attached to said brake pedal pivot pin and coupled to said brake pedal foot pad on one end portion for movement of said second brake pedal arm responsive to movement of said brake pedal foot pad;

a third brake pedal arm operatively coupled to said second master cylinder and movably attached to said brake pedal pivot pin and coupled to said brake pedal foot pad on the other end portion thereof for movement of said third pedal arm responsive to movement of said brake pedal foot pad;

whereby applying pressure to said brake pedal foot pad while moving said foot pedal brake pad on said first brake pedal arm and applying pressure thereto varies the pressure applied to the first and second master cylinders to allow an operator to vary the force applies to said first and second master cylinders by the rotation of said brake pedal foot pad.

2. A vehicle brake pedal in accordance with claim 1 in which second brake pedal has a roller ball thereon for said brake pedal foot pad one end portion to ride on.

3. A vehicle brake pedal in accordance with claim 2 in which third brake pedal has a roller ball thereon for said brake pedal foot pad other end portion to ride on.

4. A vehicle brake pedal in accordance with claim 3 in which said first pedal arm is movably attached to a vehicle.

5. A vehicle brake pedal in accordance with claim 4 in which brake pedal foot pad has a bracket mounted thereto for movably attaching said brake pedal foot pad to said first pedal arm.

* * * * *